(No Model.)
G. A. PHIFER.
COFFEE BOILER.
No. 444,014. Patented Jan. 6, 1891.
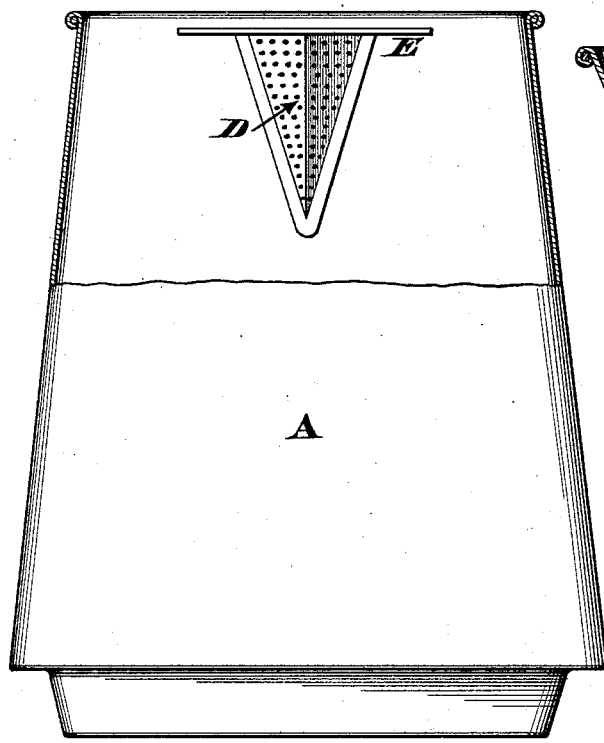
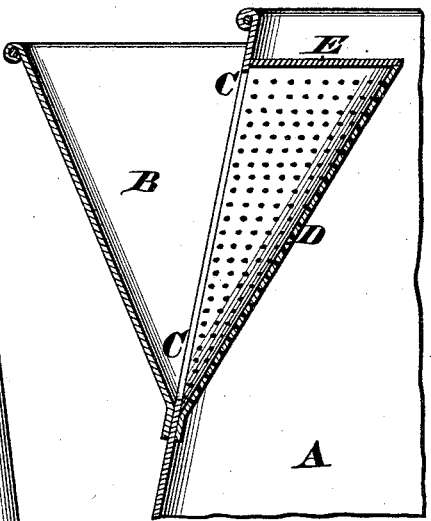
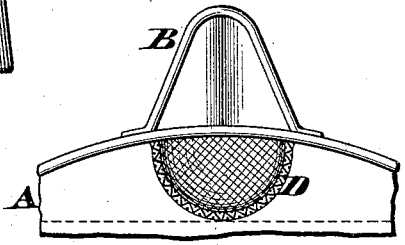
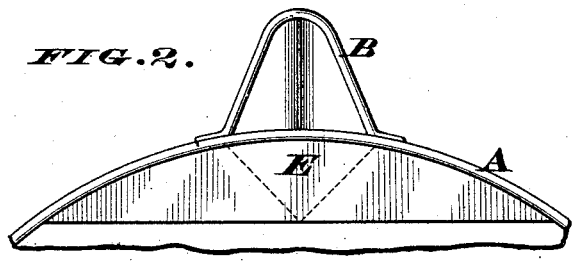
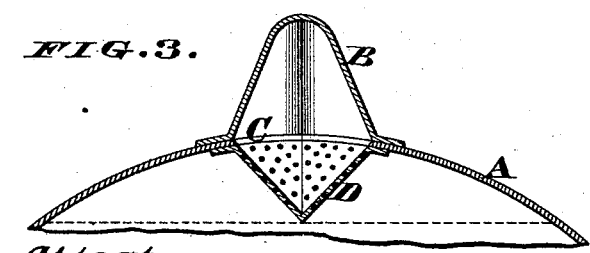
Attest.
L. C. Layman.
Samuel M. Quinn.
Inventor.
George A. Phifer.
by James H. Layman.
Atty.

UNITED STATES PATENT OFFICE.

GEORGE A. PHIFER, OF HARRISON, OHIO.

COFFEE-BOILER.

SPECIFICATION forming part of Letters Patent No. 444,014, dated January 6, 1891.

Application filed September 6, 1890. Serial No. 364,118. (No model.)

*To all whom it may concern:*

Be it known that I, GEORGE A. PHIFER, a citizen of the United States, residing at Harrison, in the county of Hamilton and State of Ohio, have invented certain new and useful Improvements in Coffee Boilers or Pots; and I do hereby declare the following to be a full, clear, and exact description of the invention, reference being had to the annexed drawings, which form a part of this specification.

The object of my invention is to permit a free and unobstructed flow of coffee into the spout of a coffee boiler or pot, and to prevent the strainer of the vessel being choked or clogged up with "grounds," which result is accomplished as follows: An opening is made in the side of the vessel and near its top, which opening is as large as the spout will admit and conforms to the shape of the latter, a strainer being secured within the boiler or pot for the purpose of screening said opening. This strainer projects into the vessel a suitable distance, and is either angular or crowning, so as to deflect the grounds down its sloping sides and leave the ridge or apex of said strainer free to permit the escape of clear coffee, as hereinafter more fully described.

Another feature of my invention consists in covering the open upper end of the strainer with a segmental plate which extends across a portion of the vessel, and thereby serves as a guard or barrier that prevents coffee running out at the top of the boiler or pot when the latter is inclined, as hereinafter more fully described.

In the annexed drawings, Figure 1 is a sectionized elevation looking toward the front of a coffee boiler or pot embodying my improvements, the lid, bail, and handle of the vessel being omitted. Fig. 2 is an enlarged plan of a portion of said vessel. Fig. 3 is a horizontal section thereof. Fig. 4 is a vertical section through the spout and strainer of the vessel. Fig. 5 is a modification of the invention.

A represents an ordinary coffee boiler or pot, and B is a customary discharge-spout of the same.

C is an opening in the side of the vessel and of such a size and shape as will permit a free flow of coffee into the aforesaid spout.

D is a perforated plate or other similar strainer soldered within the vessel and adapted to guard the opening C. The exact shape of this strainer is immaterial, provided it is raised in the center, so as to deflect or shed the grounds down its sides, and thereby prevent them escaping through the spout B. As seen in Figs. 1, 2, and 3, this inwardly-projecting strainer is angular or ridge-shaped, while in Figs. 4 and 5 it is bowed or crowning.

E is a plate that serves as a cover for the open upper end of said strainer, which plate is of the segmental shape seen in Fig. 2 and indicated by the dotted lines in Figs. 3 and 5. Reference to these illustrations shows that this plate is as wide as the top of the strainer and extends straight across to the opposite sides of the boiler or pot, thereby forming a barrier at the upper end of said vessel. From this description it is apparent that when the vessel is inclined for the purpose of pouring out coffee the fluid is arrested by the barrier E and strainer D, the sloping sides of which latter deflect or shed the grounds both to the right and left. Consequently the ridge or apex or most elevated portion of the strainer is entirely free from these obstructions, and allows a clear stream of coffee to run out of the discharge-spout B.

In the modification of my invention seen in Fig. 5 the guard-plate E is omitted, and its position indicated by dotted lines, the strainer being here shown as made of wire-cloth.

I claim as my invention—

1. In combination with a coffee boiler or pot having near its top a discharge-spout B and an opening C, leading into the latter, and a strainer D, projecting into the vessel, which strainer is raised in the center and slopes down to the sides and bottom of said opening, as herein described, and for the purpose stated.

2. In combination with a coffee boiler or pot having near its top a discharge-spout B and an opening C, leading into the latter, and a strainer D, projecting into the vessel, which strainer is raised in the center, slopes down to the sides and bottom of said opening, and is covered at top by a segmental plate E, arranged as herein described, and for the purpose stated.

In testimony whereof I affix my signature in presence of two witnesses.

GEORGE A. PHIFER.

Witnesses:
JAMES H. LAYMAN,
SAMUEL M. QUINN.